United States Patent [19]

Kobayashi et al.

[11] 4,214,960
[45] Jul. 29, 1980

[54] METHOD OF ELECTROLYTICALLY ETCHING FERRITE

[75] Inventors: Tomio Kobayashi, Tagajo; Hidesuke Miyairi, Rihu, both of Japan

[73] Assignee: Sony Corporation, Tokyo, Japan

[21] Appl. No.: 912,994

[22] Filed: Jun. 6, 1978

[30] Foreign Application Priority Data

Jun. 14, 1977 [JP] Japan .................................. 52-70231

[51] Int. Cl.$^2$ ............................. C25F 3/02; C25F 3/14
[52] U.S. Cl. ............................ 204/129.65; 204/129.95
[58] Field of Search ............ 204/129.65, 129.9, 129.85, 204/129.95

[56] References Cited

U.S. PATENT DOCUMENTS

| 1,047,995 | 12/1912 | Schwuchow et al. | 204/129.65 |
| 3,527,682 | 9/1970 | Valvo | 204/129.65 |
| 3,560,357 | 2/1971 | Shaw | 204/129.65 |
| 3,560,358 | 2/1971 | Black | 204/129.65 |
| 3,929,591 | 12/1975 | Chu | 204/129.9 |
| 4,169,026 | 9/1979 | Kikuchi et al. | 204/129.65 |

Primary Examiner—T. M. Tufariello
Attorney, Agent, or Firm—Hill, Van Santen, Steadman, Chiara & Simpson

[57] ABSTRACT

A method of electrolytically etching a ferrite body wherein the body is immersed in an etching electrolyte of controlled concentration, an electrode is positioned in the electrolyte in spaced relation to the body, with the ratio of exposed surface area of the ferrite body and the confronting surface area of the electrode being within a predetermined range, and applying a unidirectional voltage between the ferrite body and the electrode, the ferrite body being at a negative voltage relative to the electrode for a sufficient time to cause the desired etching.

15 Claims, 15 Drawing Figures

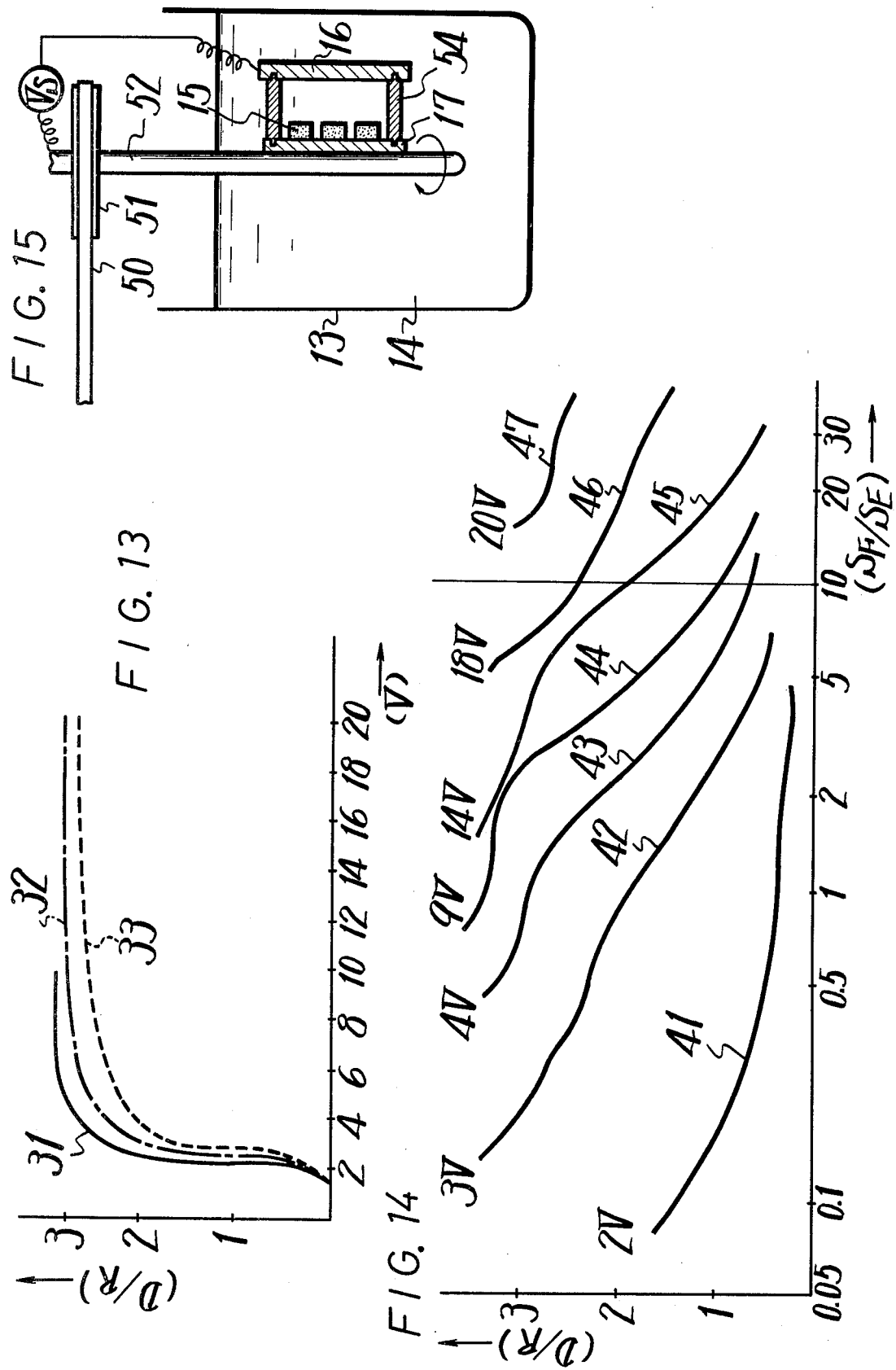

METHOD OF ELECTROLYTICALLY ETCHING FERRITE

BACKGROUND OF THE INVENTION

1. Field of the Invention

The present invention relates to a method for electrolytically etching a ferrite body wherein the body is employed as the cathode in an electrolytic cell under controlled conditions to secure the required etching.

2. Description of the Prior Art

In the manufacture of ferrite magnetic transducer heads, for example, it is necessary that the ferrite starting material which forms the head cores be provided with grooves. One system commonly employed consists in grinding grooves into a pair of ferrite blocks and then adhesively bonding the blocks together. In such mechanical processing, however, the dimensional accuracy is not sufficiently great. This is particularly true in the case of manufacturing a video magnetic head which requires a high degree of accuracy. Consequently, it is difficult to produce magnetic heads which have uniform characteristics economically. Furthermore, in the case of mechanical processing, defects such as residual distortion in the head are created, and the magnetic characteristics of the ferrite are deteriorated. In addition, in the case of mechanical processing, the magnetic head which can be produced is limited in terms of its configuration.

Another technique which has been used is the chemical etching technique. In this type of technique, a highly concentrated acid such as a 50% aqueous solution of hydrochloric acid or concentrated phosphoric acid is used. When phosphoric acid is employed, it is heated up to about 50° C. to make the etching speed sufficiently high.

In the typical chemical etching technique, an etching resist is coated on the ferrite body, and a suitable pattern is photographically applied to the resist coating, and selectively removed by development to provide a patterned ferrite body. Then, this body is etched with the acid in the portions of the resist coating which have been removed by the development process. With this type of chemical etching, however, there is a substantial amount of undercutting or side etching because the etchant permeates into the ferrite block beneath the resist coating and beyond the limits of the desired pattern. It is accordingly difficult to form a deep groove in a ferrite body by means of the chemical etching technique.

SUMMARY OF THE INVENTION

The present invention provides an improved method for providing grooves in a ferrite body. It involves selectively etching a ferrite body in an electrolytic cell wherein the ferrite body to be processed and an electrode are immersed in an etching electrolyte in confronting, spaced relation. A negative voltage is applied to the ferrite body with respect to the electrode. The concentration of the electrolyte, the ratio of exposed confronting surface area of the ferrite body and the surface area of the electrode are controlled as is the applied voltage so as to minimize undercutting or side etching and to minimize surface roughness.

In a specific embodiment of the present invention, the etching electrolyte has a concentration of from 0.005 to 10 mols per liter of solution, the ratio of exposed surface area of ferrite body to the surface area of the electrode is less than 10, and a unidirectional voltage of from 3 to 20 volts is applied between the ferrite body and the electrode.

BRIEF DESCRIPTION OF THE DRAWINGS

FIGS. 13 and 14 are graphs showing the relationship of etching factor to parameters used in the etching process; and FIG. 15 is a somewhat schematic view of another apparatus which can be used for practicing the method of the present invention.

DESCRIPTION OF THE PREFERRED EMBODIMENTS

Figure 1:
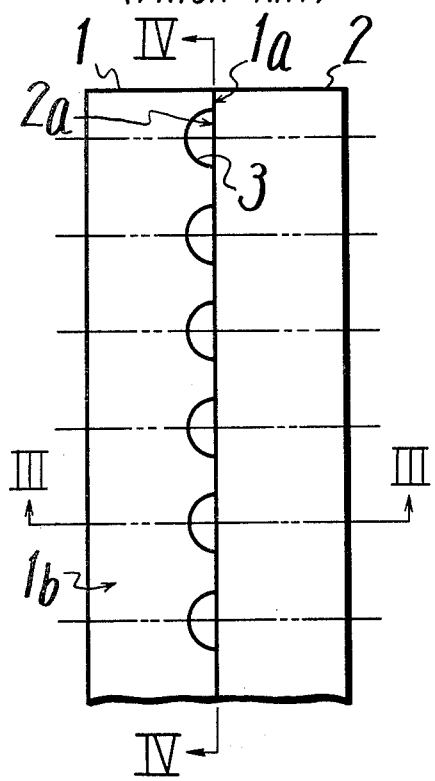
FIG. 1 is a front view of two ferrite core blocks in assembled relation.

A prior art technique for providing grooves in ferrite transducer heads will be described in conjunction with FIGS. 1 through 5. Initially, there is provided a pair of ferrite core blocks 1 and 2 which are adhesively secured together with their side surfaces 1a and 2a in opposed confronting relationship. On the surface 1a of the block 1 is a plurality of track width defining grooves 3. These grooves 3 are arranged in parallel relationship with each other and with a predetermined spacing. Each groove extends between the surfaces 1b and 1c of the block 1 which are adjacent to the surface 1a along its longitudinal direction. The block 2 is provided at its surface 2a with a winding groove 4 which is arranged in close proximity to the surface 2b corresponding to the surface 1b of the block 1, and spaced from the surface 2b for defining the depth of an operating magnetic gap extending in a direction crossing each groove 3. It is also provided with a notch 5 which is formed in the direction of the groove 4 at the edge between the surface 2a and the surface 2c which corresponds to the surface 1c of the block 1.

The blocks 1 and 2 are oriented such that their opposing surfaces 1a and 2a are in confronting relationship, the surfaces 1c and 2c being positioned upwardly and the surfaces 1b and 2b being positioned downwardly. Then, glass rods (not shown) are inserted into the notch 5 and the groove 4, respectively. With the glass rods in place, the blocks 1 and 2 are heated until the glass rods are rendered molten, and the glass material flows into the grooves 3, between the surfaces 1a and 2a, to bond the blocks 1 and 2 together as a unitary body.

Figure 2:
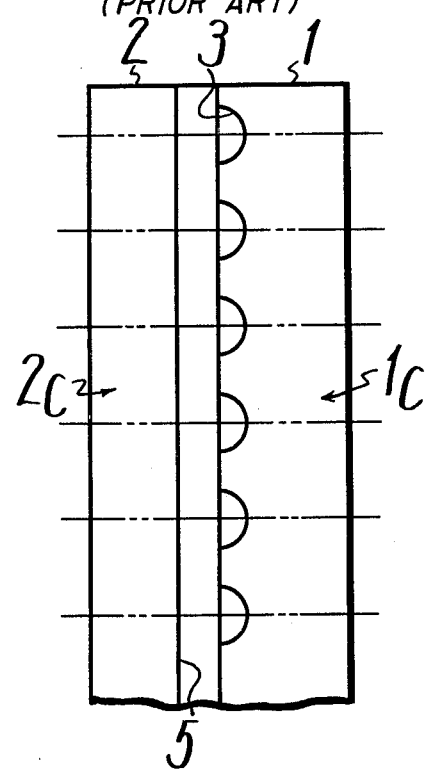
FIG. 2 is a rear view of the structure shown in FIG. 1.
Figure 3:
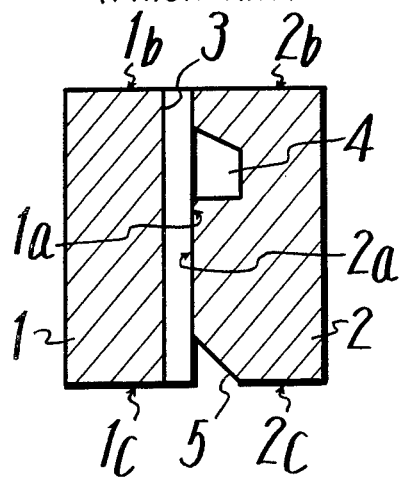
FIGS. 3 and 4 are cross-sectional views taken substantially along the lines III—III and IV—IV of FIG. 1.
Figure 4:
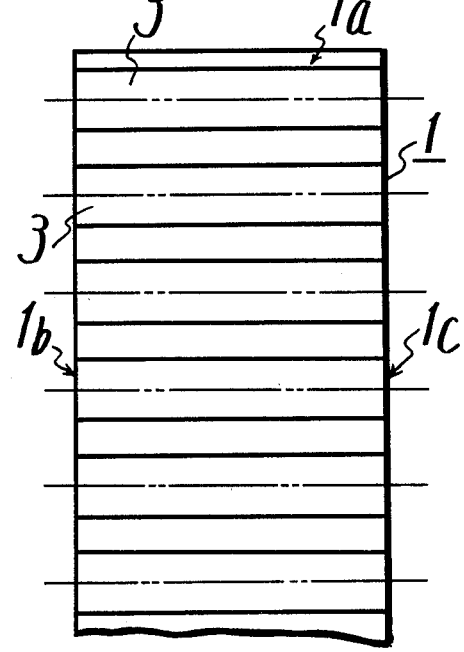
Figure 5:
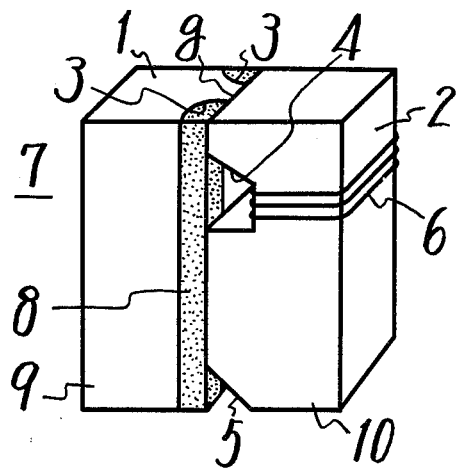
FIG. 5 is a view in perspective illustrating a magnetic head obtained by suitably cutting the ferrite block shown in FIGS. 1 to 4.

The thus bonded blocks 1 and 2 are then cut in such a manner that each cutting line extends along each groove 3 as shown in FIGS. 1, 2, and 4 by the double dot chain lines. Then, a winding 6 is wound on the cut block 2 through the groove 4 to produce a magnetic head as shown in FIG. 5. In that Figure, reference numeral 8 designates a glass deposit in the groove 3, and reference numeral 9 a half core made from a portion of the block 1, and reference numeral 10 a half core made from a portion of the block 2, respectively. Between the half cores 9 and 10 there exists an operating magnetic gap g whose length in the track width direction is defined by the grooves 3 and whose depth is defined by the groove 4.

As noted previously, this mechanical system is providing grooves in the ferrite heads does not produce high accuracy, and is limited in its application to particular configurations.

Figure 6:
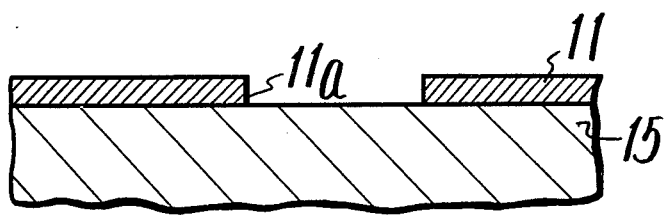
FIGS. 6 and 7 are diagrammatic illustrations on a highly enlarged scale illustrating the steps involved in the chemical technique.
Figure 7:
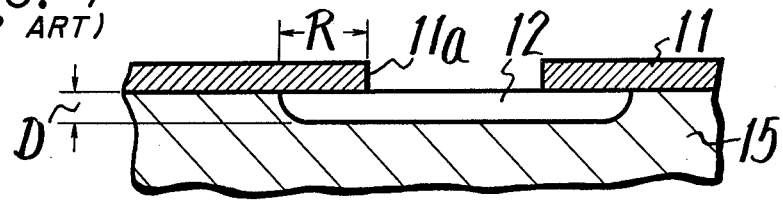

In order to overcome these defects, there has been proposed a chemical etching technique which is shown diagrammatically in FIGS. 6 and 7. An etching resist layer 11 is first coated on a ferrite body 15, the resist having a predetermined pattern such as a window 11a in the position corresponding to a groove to be formed on the ferrite body 15, as shown in FIG. 6. This etching resist 11 is produced by coating, for example, a photosensitive resin on the ferrite body 15, photographically exposing the layer of the resin, and developing the same usually with a solvent to produce a predetermined pattern including the window 11a. Then, as shown in FIG. 7, the ferrite body 15 is etched by a high concentration acid through the window 11a of the etching resist 11. Thus, a groove 12 is formed in the ferrite body 15. The groove 12 formed by the acid etchant has a so-called side etching or undercutting of a relatively large size, which is caused by the fact that the etchant permeates into the ferrite body under the resist 11 from the edge of the window 11a. If the depth of the groove 12 is identified as in FIG. 7 by the reference character D, and the width of the side etching or the undercutting in the lateral direction is identified as R in FIG. 7, then the etching factor which is defined as D/R is frequently less than 1. Accordingly, it is difficult to form a deep groove on a ferrite body by the chemical etching technique. It is difficult to form the grooves 3 which restrict the track width, the groove 4 for the winding 6, or the notch 5 in the depth greater than about 10 microns. Furthermore, the photoresist 11 is not particularly resistant to acid at elevated temperatures, so this technique cannot always be used to provide grooves with a desired depth.

Figure 8:
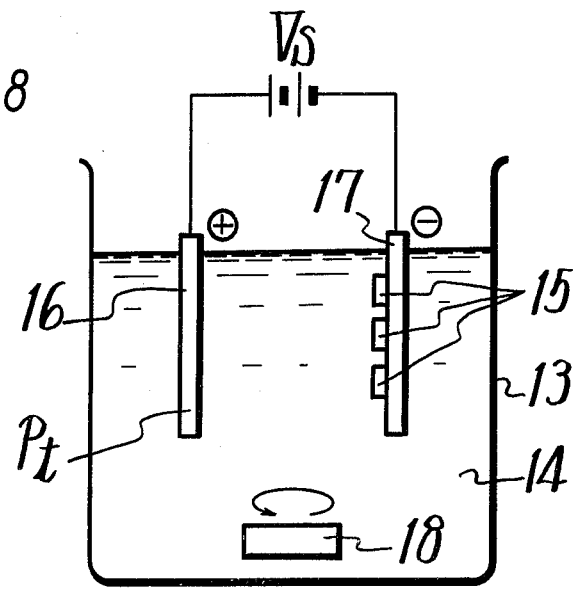
FIG. 8 is a somewhat schematic showing of an apparatus used for electrolytically etching a ferrite according to the present invention.

In accordance with the present invention, as shown in FIG. 8, there is provided an electrolytic etchant 14 into which are immersed ferrite bodies 15 to be processed and an electrode 16 made, for example, of platinum which is in spaced opposed relation to the ferrite bodies 15 with a predetermined distance. In this case, a DC voltage of 3 to 20 volts is applied between the ferrite bodies 15 and the electrode 16, with the ferrite blocks being negative relative to the electrode 16. The voltage can be either continuously or intermittently applied.

The portions of the ferrite body 15 to be processed, corresponding to the grooves 3 for restricting the track width, the groove 4 for receiving the windings 6 and the notch 5 are exposed through the windows 11a, while the other parts of the ferrite body 15 are covered with an etching resist layer 11 as described in connection with FIG. 6. The ferrite bodies 15 are secured in electrical contact to a conductive body 17 made, for example, of stainless steel or the like and a DC voltage source $V_S$ is connected between the electrode 16 and the conductive body 17. The ratio between the exposed surface area $S_F$ of the ferrite body 15 (where the etching resist 11 covers the ferrite body 15, the area $S_F$ is the total exposed area of the ferrite 15 through the windows 11a) and the surface area $S_E$ of the opposing electrode 16 is made smaller than 10. The concentration of the electrolyte etchant 14 is between 0.005 and 10 mols per liter. In FIG. 8, reference numeral 18 has been applied to a stirrer such as a magnetic stirrer for stirring the electrolytic etchant 14.

The following example illustrates the method of the present invention, and the results achieved.

EXAMPLE 1

A single crystal Mn-Zn ferrite containing 25 mol percent MnO, 25 mol percent ZnO, and 50 mol percent $Fe_2O_3$ was mirror polished and then coated with a negative type etching resist consisting of a rubber based resin. Etching windows, each of which had a uniform width and a linear band shape were formed through the etching resist by conventional exposing and developing processes. The ferrite block coated with the etching resist and an electrode made of platinum were immersed in an aqueous solution of phosphoric acid of 0.2 mol per liter concentration at room temperature. A DC voltage of 6 volts was applied between the electrode and the ferrite body, the latter being negative relative to the electrode, to carry out electrolytic etching for 11 minutes.

The etching factor D/R, the etching speed, and the existence of concave or convex surfaces in any side etching by the above described electrolytic etching process were compared with prior art techniques with the following results.

TABLE 1

| | D/R | Etching Speed | Concavity or Convexity of Side Etching |
| --- | --- | --- | --- |
| Example 1 | 2-3 | 4.5 microns/ minute | Almost none |
| Comparison 1 | 1/5-1/6 | 1 micron/min. | 5 microns |
| Comparison 2 | 1/5-1/6 | 0.5 micron/min. | 5 microns |

Comparisons 1 and 2 appearing in Table 1 were formed with a resist similar to that used in Example 1, but with a prior art chemical etching technique. The Comparison 1 involved the use of 36% aqueous hydrochloric acid at room temperature, and Comparison 2 involved the use of an aqueous phosphoric acid containing more than 85% phosphoric acid at 60° C. The chemical etching was carried out for 3 minutes.

As apparent from Table 1, the etching factor achieved from the process of the present invention is higher than that obtained from prior art chemical etching by a factor of 12 to 15 times. Thus, according to the present invention, the etching can be relatively deep but narrow.

Furthermore, the etching speed is much higher than obtained in chemical etching according to the prior art, and this is very advantageous from the industrial standpoint.

In addition, the pattern of side etching or the edge portion where the surface of the ferrite contacts the periphery of the etched groove were either convex or concave contours having a width of about 5 microns using prior art etching techniques, but according to the present invention the convex and concave surfaces were almost completely avoided. Thus, the etching of a fine pattern with the process of the present invention can be carried out with high accuracy.

In Example 1, the negative type photoresist was a rubber based resin, but other types of etching resists can also be used such as a positive type photoresist of a novolak resin, a vacuum deposited $SiO_2$ film, a sputtered $SiO_2$ film, or the like.

EXAMPLE 2

An etching resist having the same pattern as that of Example 1 was formed on the single crystal Mn-Zn ferrite, with phosphoric acid of 0.1 mol per liter being used as the electrolytic etchant. A DC voltage of 4 volts was used as the voltage source $V_S$, and the electrolytic etching was carried out for 20 minutes.

Figure 9:
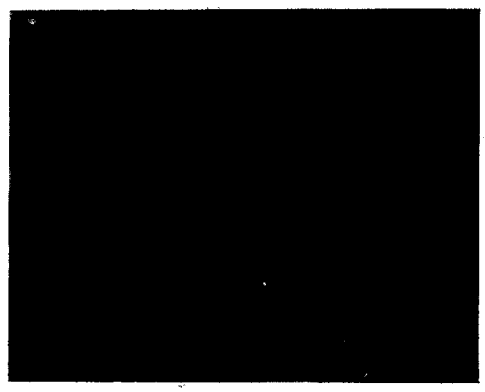
FIG. 9 is a photomicrograph of a selectively etched groove produced by the method of the present invention.
Figure 10:
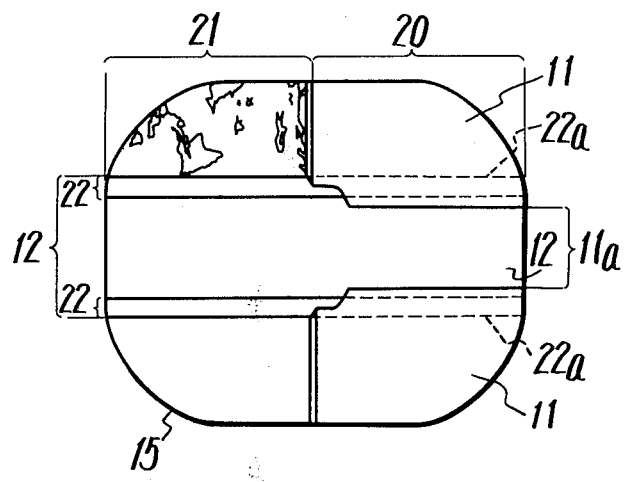
FIG. 10 is a diagram used to explain the various areas of the photomicrograph of FIG. 9.

FIG. 9 is a photomicrograph enlarged by 400 times showing the ferrite body which had been subjected to the above described electrolytic etching, with the etching resist being removed. FIG. 10 is a diagram which can be used for explaining the photomicrograph of FIG. 9. The area of the ferrite 15 indicated by reference numeral 20 in FIG. 10 is a half area with the etching resist 11 still in place, through a part of which a band shaped window 11a was formed. The area indicated at reference numeral 21 is another half area with the etching resist 11 having been removed. On both sides of the groove 12 which is formed by the electrolytic etching, there are inclined portions 22 caused by side etching, but the edge portion 22a of each inclined portion 22 is essentially a straight line. In this case, the depth of the etched groove 12 was 42 microns, and the width of the side etching was 14 microns, so that the etching factor D/R was 3.

Figure 11:
FIG. 11 is a photomicrograph of a selectively etched groove obtained by prior art chemical etching techniques.
Figure 12:
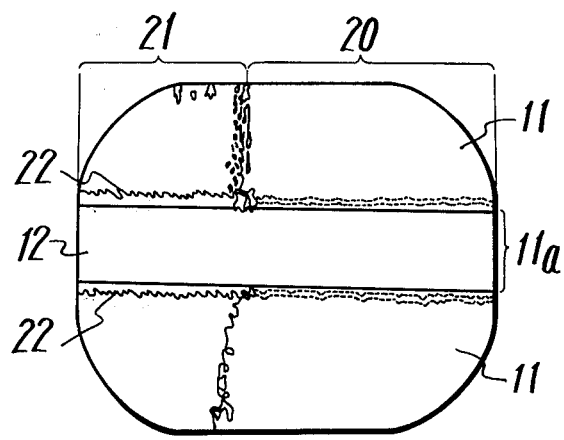
FIG. 12 is a diagram used to explain the photomicrograph of FIG. 11.

FIG. 11 is a photomicrograph similar to that of FIG. 9 illustrating a ferrite on which a groove has been formed by the prior art chemical etching technique. In this particular instance, hydrochloric acid at room temperature was used to etch the material for one minute. FIG. 12 is a diagram which can be used for explaining the photomicrograph of FIG. 11. The depth of the etched groove 12 is 2 microns, and the width of the side etching is up to 10 microns so that the etching factor was 0.2. In this case, different crystallographic surfaces were exposed to the etching solution, as compared with comparisons 1 and 2. In FIG. 12, the parts corresponding to those of FIG. 10 are marked with the same reference numerals.

From the foregoing it is apparent that according the prior art chemical etching technique, not only is it not possible to form a deep groove but also the edge portions of the groove are formed with substantial concavity or convexity by side etching, as apparent from the photomicrograph of FIG. 11.

The lower limit of concentration of electrolytic etchant is 0.005 mols per liter since if the concentration lower than that figure, the electrolytic etching proceeds with difficulty, and the etching speed is too slow to be commercial. If the concentration is higher than 10 mols per liter, the etching factor becomes lower, and the etching speed becomes excessively high, so that it is impossible to provide a fine pattern of etching with high accuracy.

FIG. 13 is a graph showing the relationship between the DC voltage applied between the ferrite and the opposing electrode, with the ferrite body being negative, and the etching factor D/R. In the graph of FIG. 13, the curves 31, 32 and 33 corresponding to cases where the phosphoric acid concentration of the etchant was 0.1 mol/l, 0.5 mol/l and 1.0 mol/l respectively. As apparent from the graph of FIG. 13 within the concentration ranges of the etchants as described above, the etching factors are almost the same but as the concentration of the etchant increases the etching factor becomes lower. As also apparent from the graph of FIG. 13, when the applied voltage is within the range of about 3 to 20 volts, there is no significant difference in the etching factor but when the applied voltage is less than 3 volts, the etching factor decreases substantially.

The applied voltage should be no more than 20 volts because if it exceeds 20 volts, heat generation becomes substantial and cracks are formed in the ferrite due to the thermal expansion when the electrolytic etchant is relatively high in concentration.

When the electrolytic etchant is of a low concentration and a voltage greater than 20 volts is applied, a different phase having a metallic luster is deposited on the surface of the ferrite, or the metal of the opposing electrode starts to become removed. Even if a carbon electrode is used, a different phase is deposited at these extreme conditions.

Any material can be used to form an electrode which is sufficiently electrically conductive, and resistant to the electrolytic etchant. For example, platinum, stainless steel, and carbon can be readily used as the material for the electrode.

FIG. 14 is a graph illustrating the relationship between the ratio $S_F/S_E$ where $S_F$ is the exposed area of the ferrite and $S_E$ is the surface area of the opposing electrode as described previously and the etching factor D/R. In the graph of FIG. 14, curves 41, 42, 43, 44, 45, 46 and 47 correspond to the cases where the power source voltage $V_S$ was 2, 3, 4, 9, 14, 18, and 20 volts respectively. In all cases, a phosphoric acid of 0.1 mol/l was used as the etchant. As apparent from the graph of FIG. 14 as the voltage of the power source becomes lower, the etching factor also becomes lower, and as the ratio $S_F/S_E$ becomes high, the etching factor tends to be lowered. When the ratio $S_F/S_E$ increases, particularly to a value greater than 10, the current density becomes non-uniform, and accordingly scattering appears in the etching. In order to increase the etching factor, it is desirable that the applied voltage across the opposing electrode and the ferrite be higher than 4 volts, and the ratio $S_F/S_E$ be lower than 5.

In obtaining the data shown in FIGS. 13 and 14, the electrolytic etching was carried out until the amount of side etching (R) became 20 microns.

In the above examples, an aqueous solution of phosphoric acid was used as the electrolytic etchant. However other etchants can be used including ethanol solutions of phosphoric acid, aqueous solutions of perchloric acid, ethanol solutions of perchloric acid, aqueous solutions of oxalic acid, aqueous solutions of hydrochloric acid, and the like can also be used.

It is not always necessary that the electric field generated between the ferrite being processed and the opposing electrode be limited to a voltage source connected between the opposing electrode and the ferrite directly or through the conductive body, but it can be generated indirectly. For example, another electrode spaced from and not electrically connected to the ferrite can be immersed into the etchant at the opposite side of the opposing electrode, and this electrode connected to the negative electrode of the voltage source to produce the electric field indirectly.

It has been ascertained that when the electrolytic etching is carried out with the ferrite being negative, the etching speed is remarkably high, the side etching is limited, and etching can be achieved with high accuracy as compared in the case when the etching is produced with the ferrite body being positive. By way of example, referring to Example 1 of the present invention, an etching speed of 4.5 microns per minute was achieved when the ferrite was the negative body. When the polarity of the applied voltage was reversed, i.e., when the ferrite was connected to the positive electrode of the voltage source, and the platinum electrode connected to the negative terminal, using an aqueous solution of phosphoric acid of 0.2 mol/l as the etchant, and an applied voltage of 20 volts, the etching speed was only 0.1 micron per minute. Using an aqueous solution of phosphoric acid of 3 mol/l as the etchant, and an applied voltage of 6 volts, with the polarity similarly reversed, the etching speed was only 0.5 microns per minute.

FIG. 15 is a schematic showing of an apparatus which can be used to carry out the method of the present invention. A rotary member 52 composed, for example, of a conductive material is rotated by a motor (not shown) through a belt 50 and a pulley 51. A conductive body 17 to which the ferrite bodies 15 are electrically attached is mounted on the rotary member 52 in electrical contact therewith, and the opposing electrode 16 is attached to the rotary member 52 through insulating posts 54 to provide a predetermined distance between the ferrite bodies 15 and the opposing electrode 16. The voltage source $V_S$ connected between the opposing electrode 16 and the conductive body 17 through the rotary member 52. When the rotary member 52 is rotated in the bath 13, the electrolytic etchant 14 therein is stirred and electrolytic etching is carried out.

In the above examples, a single crystal Mn-Zn ferrite was used, but the method of the present invention can be applied not only to single crystals but also to polycrystalline ferrites with good results.

Further, the etching method of the present invention can be applied not only to soft magnetic materials such as Mn-Zn or Ni-Zn ferrites but also to hard magnetic materials such as barium ferrites or strontium ferrites with good results.

Particularly good results obtained when using the process of the present invention on an Mn-Zn ferrite having a composition surrounded by the following three points on the ternary diagram (A: MnO 15 mol%, ZnO 30 mol %, $Fe_2O_3$ 55 mol %, B: MnO 40 mol %, ZnO 20 mol %, $Fe_2O_3$ 40 mol %, C: MnO 30 mol %, ZnO 15 mol %, $Fe_2O_3$ 55 mol %,). This ferrite has superior magnetic characteristics and is suitable for making a good magnetic transducer head by using the etching process of the present invention.

As described above, the method of the present invention permits etching of a ferrite to produce deep, clean grooves so that when applied to a ferrite magnetic head, the defects encountered in prior art mechanical processing are eliminated, and we can produce magnetic heads with uniform magnetic characteristics.

It will be apparent that many modifications and variations can be effected by those skilled in the art without departing from the spirit and scope of the novel concepts of the present invention, and that the scope of the invention should be determined by the appended claims only.

We claim as our invention:

1. A method of electrolytically etching a ferrite body which comprises:
   immersing said body in an acid etching electrolyte capable of etching said body and having a concentration of from 0.005 to 10 mols per liter of solution, positioning an electrode in said electrolyte in spaced relation to said body,
   the ratio of exposed surface area of the ferrite body and the surface area of said electrode being less than 10, and applying a unidirectional voltage of 3 to 20 volts between the ferrite body and said electrode, said ferrite body being at a negative voltage relative to said electrode.

2. A method of electrolytically etching a ferrite body as claimed in claim 1, wherein said ferrite is a single crystal ferrite.

3. A method of electrolytically etching a ferrite body as claimed in claim 1, wherein said ferrite is a single crystal Mn-Zn ferrite.

4. A method of electrolytically etching a ferrite body as claimed in claim 1, wherein said ferrite is a single crystal Ni-Zn ferrite.

5. A method of electrolytically etching a ferrite body as claimed in claim 1, wherein said ferrite is a polycrystalline ferrite.

6. A method of electrolytically etching a ferrite body as claimed in claim 1, wherein said etching electrolyte is phosphoric acid, perchloric acid, oxalic acid, or hydrochloric acid.

7. A method of electrolytically etching a ferrite body as claimed in claim 1, wherein said electrode is composed of platinum.

8. A method of electrolytically etching a ferrite body as claimed in claim 1, wherein said electrode is composed of stainless steel.

9. A method of electrolytically etching a ferrite body as claimed in claim 1, wherein said voltage is greater than 4 volts.

10. A method of electrolytically etching a ferrite body as claimed in claim 1, wherein said ratio is less than 5.

11. A method of electrolytically etching a ferrite body as claimed in claim 1, which includes the step of stirring the etching electrolyte during etching.

12. A method of electrolytically etching a ferrite body as claimed in claim 1, wherein the etching is continued until an etching factor of greater than 2 is obtained, the etching factor being the ratio between the depth of an etched groove and the width of side etching.

13. A method of electrolytically etching a ferrite body as claimed in claim 1, wherein said etching electrolyte is phosphoric acid.

14. A method of electrolytically etching a ferrite body as claimed in claim 1, wherein said etching electrolyte is an aqueous solution of phosphoric acid.

15. A method of electrolytically etching a ferrite body according to claim 1 wherein said ferrite body is masked in selected areas with an electrolyte resistant material prior to being immersed in said electrolyte.

* * * * *